(No Model.)

I. SCOVILLE.
FRUIT SLICING MACHINE.

No. 580,560.  Patented Apr. 13, 1897.

Witnesses,
G. H. Annee
H. F. Ascheck

Inventor,
Ives Scoville
By Dewey & Co.
Attys

United States Patent Office.

IVES SCOVILLE, OF OAKLAND, CALIFORNIA.

FRUIT-SLICING MACHINE.

SPECIFICATION forming part of Letters Patent No. 580,560, dated April 13, 1897.

Application filed August 31, 1896. Serial No. 604,456. (No model.)

*To all whom it may concern:*

Be it known that I, IVES SCOVILLE, a citizen of the United States, residing at Oakland, county of Alameda, State of California, have invented an Improvement in Fruit-Slicing Machines; and I hereby declare the following to be a full, clear, and exact description of the same.

My invention relates to the class of slicing-machines, and particularly to machines for slicing fruit, especially peaches after they have been peeled and the stones or pits removed.

It consists of the parts and the constructions and combinations of parts hereinafter described and claimed.

Figure 1:
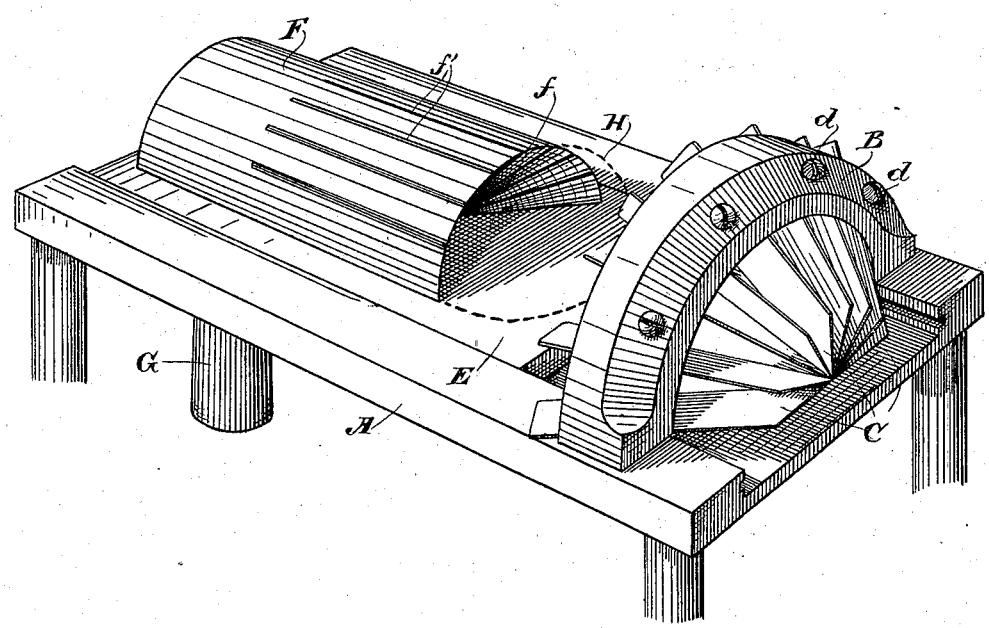
Figure 2:
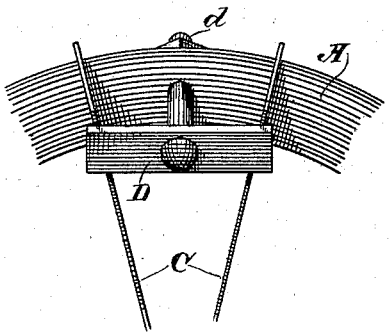

Figure 1 is a perspective of my machine. Fig. 2 is a detail showing the means for fastening the knives.

A is a suitable stand or frame. Upon this is fixed a knife-support in the form of an arch B, and to this are secured in a suitable manner the knives C. These are arranged or disposed in radial planes, and in the best form of the machine they are also set at an acute angle to the plane of the bed or frame, which said plane is that in which the movement of the fruit to the knives takes place. The knives may be secured to the arch, as I have stated, in any suitable manner, and for this purpose I have here shown them as being attached by means of yokes D and bolts *d*.

In the frame or stand A is fitted and adapted to slide a plate E, upon which is secured the fruit-holder F. This may be of any suitable material, preferably of metal. It is semicircular in cross-section, and its front end is recessed out to form a socket *f*, approximately a quarter of a sphere, and from this recess the carrier is slitted or slotted backwardly, as shown at *f'*, said slots being separated by the width of the intercutting spaces, whereby the carrier may pass through between the knives. A reciprocating motion is imparted to this fruit-holder by any suitable means. In practice and for large machines there would be a power mechanism of some kind or a foot or treadle device or a hand-crank; but for the sake of illustration merely I have here shown a handle G, by which the reciprocation may be effected.

The operation of the machine is as follows: In the preparation of peaches for slicing it is usual to peel them and remove their pits or stones. These operations leave the fruit in halves. One of these halves, such as is represented by H, is laid flat down upon the sliding plate E, so that its circumference fits within the recess of the holder F. Said holder is now moved toward the knives and the fruit is carried through between them and is thereby cut into radial slices. All these slices will be of the same size and appearance and all may be used, thus avoiding waste, and at the same time providing an attractive-looking product.

Although I have herein described the fruit as being carried to the knives, it is obvious that a reverse movement may be provided for by having the fruit stationary and the knives carried to the fruit without departing from the spirit of my invention. It will also be noted that in this operation, by reason of the knives being set at an acute angle to the plane or path of movement of the fruit, the cutting action will be more in the nature of a draw cut in that it does not take place all at once, but is gradual in its effect.

Having thus described my invention, what I claim as new, and desire to secure by Letters Patent, is—

1. In a fruit-slicer, the combination, with means for slicing the fruit, of a fruit-holder having a recessed end to form a segmental socket to receive the end of the fruit, and having a horizontal forwardly-projecting support upon which the fruit rests while being advanced to the slicing devices.

2. In a fruit-slicer, the combination, with means for slicing the fruit, of a horizontally-slidable fruit-holder having a segmental socket in one end into which the end of the fruit is placed, and having an underlying support or bottom, movable with it and upon which the severed side of the fruit rests during the slicing operation, said holder being slitted or slotted from the recessed end backwardly to permit the fruit to pass the slicing devices.

3. In a fruit-slicer, the combination, of a series of radially-disposed knives and a slidable horizontal support or plate, for the fruit, provided with a holder made semicircular in cross-section and having its front end recessed to form a socket which approximates a segment and into which the fruit is received, said holder being slitted or slotted from its socket end backwardly.

4. In a machine for slicing fruit, the combination, of a frame or stand, an arched knife-support secured thereto, a series of radially-disposed knives in said support, yokes and bolts for securing the knives to the arch and a horizontal slide in the frame, upon which the fruit is supported, having a slitted or slotted holder with a socket end to receive the fruit and hold it while it is being carried to and operated upon by the knives.

5. In a machine for slicing fruit, the combination, of a series of fixed radially-disposed knives and a horizontally-slidable support for halved fruit, comprising a holder of arched form having its forward end slitted or slotted and provided with a curved recess to receive one end of the fruit to be sliced.

6. In a machine for slicing fruit, the combination of fixed knives or cutters, a horizontally-slidable plate upon which the flat side of a severed or divided fruit is placed and an arched, longitudinally-slitted holder on said plate back of its front edge, having its front end provided with a curved recess to receive the circumference of the fruit.

7. In a fruit-slicing machine, the combination of a series of radially-disposed knives and a horizontally-slidable fruit-holder, consisting of a slotted block adapted to receive the knives whereby the fruit is cut into radial slices, said block having a recessed front to receive the fruit and a floor extension on which the fruit is supported.

8. A fruit-slicing machine comprising a suitable frame or stand, an arch carried thereby, a series of radially-disposed inclined knives carried by the arch, a plate mounted and adapted to slide in said frame or stand and form a support for the severed side of the fruit prior to and during the slicing operation, and a fruit-holder carried by said plate back of its front edge, and having a recessed front for the end of the fruit, with backwardly-extending slots to receive the knives.

In witness whereof I have hereunto set my hand.

IVES SCOVILLE.

Witnesses:
S. H. NOURSE,
WM. F. BOOTH.